United States Patent [19]

Nepela et al.

[11] Patent Number: 5,751,528
[45] Date of Patent: May 12, 1998

[54] MULTILAYER EXCHANGE COUPLED MAGNETIC POLES WITH APPROXIMATE ZERO MAGNETOSTRICTION

[75] Inventors: Daniel A. Nepela, San Jose; Siamak Sarhadi, Fremont, both of Calif.

[73] Assignee: Read-Rite Corporation, Milpitas, Calif.

[21] Appl. No.: 648,538

[22] Filed: Apr. 15, 1996

[51] Int. Cl.$^6$ ............................................. G11B 5/31
[52] U.S. Cl. ................................................. 360/126
[58] Field of Search ...................................... 360/126

[56] References Cited

U.S. PATENT DOCUMENTS 5,157,570  10/1992  Shukovsky et al. ............... 360/126
5,224,002   6/1993  Nakashima et al. ............... 360/126
5,590,008  12/1996  Tanabe et al. ..................... 360/126

*Primary Examiner*—Robert S. Tupper
*Attorney, Agent, or Firm*—Robert King; Samuel Kassatly

[57] ABSTRACT

A low noise inductive magnetic head used for writing and reading magnetic signals onto and from a magnetic recording medium includes two magnetic poles P1, P2 that are formed on a substrate which define a transducing gap therebetween. Each of the poles P1, P2 includes an outer magnetic layer formed remotely from the gap and an inner magnetic layer formed adjacent to the gap. The inner and outer magnetic layers have magnetostrictions ($\lambda_s$) of approximately equal but opposite values, such that each of the magnetic poles P1, P2 exhibits a net magnetostriction of zero or is biased within a predefined range, regardless of the individual magnetostriction values of its layers.

8 Claims, 3 Drawing Sheets

5,751,528

MULTILAYER EXCHANGE COUPLED MAGNETIC POLES WITH APPROXIMATE ZERO MAGNETOSTRICTION

FIELD OF THE INVENTION

This invention relates to magnetic recording heads and particularly to a low noise inductive head formed with magnetic poles having a net magnetostriction of approximately zero.

DESCRIPTION OF THE PRIOR ART

Prior art thin film magnetic recording heads have been fabricated from alloys of NiFe, CoFeNi, and FeSiNi (Sendust) with single continuous layers of compositions in systems wherein the magnetostriction is typically zero or less than $\pm 2 \times 10^{-6}$. The control of magnetostriction to a low value is necessary to minimize the detrimental effects, such as Barkhausen noise, i.e., covariance and pulse wiggle which occur with increasing values of magnetostriction. The prior art magnetic head compositions have been typically limited to singular compositions within the group of alloys set forth above for the purpose of lower saturation magnetostriction to avoid the detrimental effects of covariance and pulse wiggle. Thus, most inductive heads have a composition close to 81.5% Ni and 18.5% Fe by weight, so that the magnetostriction is controlled to low values, i.e., less than $\pm 1 \times 10^{-6}$. Furthermore, some of the above-mentioned alloys are limited to $4\pi M_s$ of about 11 kiloGauss. The trend in the data storage industry is to use higher coercivity media or magnetic disks which enable increased recording densities. However, several common materials such as nickel-iron could not be used with high coercivity media. Apparently, there is a need to provide magnetic thin films for use in inductive magnetic heads in which permeability and saturation magnetization ($4\pi M_s$) are optimized while magnetostriction is maintained close to zero or is biased within a controlled range.

One prior art attempt to combine beneficial magnetic properties of two materials can be found in U.S. Pat. No. 4,664,607 to Kitada. The Kitada patent describes a magnetoresistive (MR) structure formed by laminating a plurality of metallic MR layers having positive and negative magnetostrictions. The MR element exhibits zero magnetostriction or magnetostriction of a desired value. However, Kitada essentially limits its teaching to a multilayer MR structure having a thickness of less than 1000 Angstroms, with each layer having a thickness greater than 10 Angstroms. Such thickness is required since the conventional MR layer exhibits sufficient effects when its thickness is not greater than 1000 Angstroms.

Furthermore, the MR structure in Kitada is obtained by alternately laminating an equal number of metallic MR layers that have magnetostriction of opposite signs. When these layers have different thicknesses, the thickness and number of layers are adjusted so that the magnetostriction of the layers of different magnetostriction signs is compensated by a predetermined positive or negative value. However, Kitada does not address or resolve the problem of wiggle and popcorn noise in inductive recording heads.

SUMMARY OF THE INVENTION

An object of the present invention is to provide a novel inductive recording head that minimizes wiggle and popcorn noise.

Another object of this invention is to provide a magnetic structure for use in inductive magnetic heads in which permeability and $4\pi M_s$ are optimized while magnetostriction is maintained close to zero or is biased to slightly negative or positive values within a controlled range.

A further object of this invention is to provide an inductive recording head with improved performance at higher operating frequencies.

Another object of this invention is to enable the use of a wider variety of magnetic materials for inductive recording heads.

In accordance with this invention, a low noise inductive magnetic head includes two magnetic pole layers P1, P2 that are formed on a substrate. The pole layers define a transducing gap between pole tip regions. Each of the poles P1, P2 includes an outer magnetic layer formed remotely from the gap and an inner magnetic layer formed adjacent to the gap. The inner and outer magnetic layers have saturation magnetostrictions ($\lambda_s$) of approximately equal but opposite values, such that the magnetic poles P1, P2 exhibit a net magnetostriction of approximately zero or are magnetostriction biased within a predefined range, regardless of the individual magnetostriction values of its layers. In addition, the inner magnetic layer is formed of a material that has a high saturation magnetization ($4\pi M_s$) in order to create a high write field gradient closer to the gap. In effect, the multilayer poles are exchange coupled so that the desired net zero magnetostriction serves to provide a high write field with suppression of popcorn noise and wiggle.

In one embodiment, the $\lambda_s$ of the inner pole is positive and that of the outer pole is negative. In an alternative embodiment, the inner and outer layer arrangement may be reversed, but the layers provide equal and opposite values of magnetostriction or may be biased slightly positive or negative in overall magnetostriction. These alternative configurations may be either exchange coupled or magnetostatically coupled.

In one specific embodiment, each of the poles P1, P2 includes a plurality of exchange coupled magnetic layers that are formed by alternately laminating a number of layers that have positive magnetostriction, with an equal number of layers that have negative magnetostriction, such that the net overall magnetostriction of each pole is close to zero or is magnetostriction biased within a desired range.

In another embodiment each of the poles P1, P2 includes a plurality of nonmagnetic layers that are interposed between a plurality of magnetic layers so that these magnetic layers are magnetostatically coupled. In one example, half of the magnetic layers have a positive magnetostriction, and the remaining half have a negative magnetostriction, such that the net overall magnetostriction of each pole P1, P2 is close to zero or is magnetostriction biased within a desired range.

BRIEF DESCRIPTION OF THE DRAWING

The invention will be described in greater detail with reference to the drawing in which.

Similar numerals refer to similar elements in the drawing. It should be understood that the sizes of the different components in the figures may not be to scale, or in exact proportion, and are shown for visual clarity and for the purpose of explanation.

DETAILED DESCRIPTION OF THE INVENTION

Figure 1:
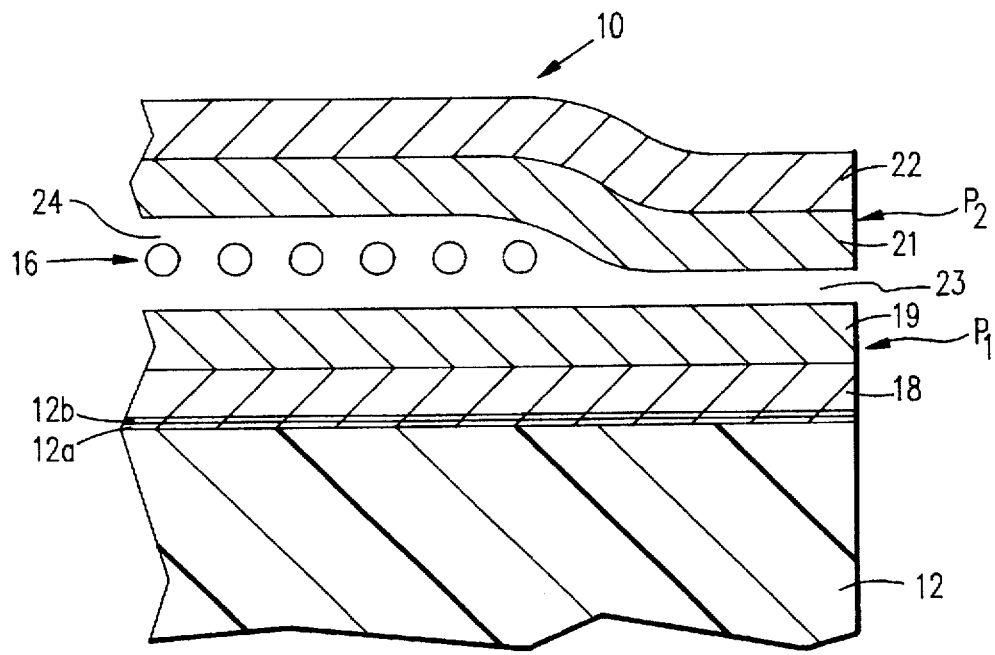
FIG. 1 is a partial cross-sectional view of a two-pole inductive head made according to the present invention.

FIG. 1 shows part of an inductive head 10 which is made according to a first embodiment of the present invention, and which is used for writing and reading magnetic signals onto and from a magnetic recording medium. The head 10 is formed of a nonmagnetic ceramic substrate 12 on which an optional insulating layer 12a, preferably of aluminum oxide, is deposited. A seed layer 12b of a nickel-iron material, such as Permalloy, is deposited onto the insulating layer 12a. A first magnetic pole P1, made of Permalloy, is plated thereover. A nonmagnetic insulator layer 24, which electrically isolates the pole P1, encompasses conductive coils 16. A second magnetic pole P2, made of Permalloy, is plated onto the insulator layer 24.

In accordance with one embodiment of this invention, pole P1 is formed of two magnetic layers 18, 19, and pole P2 is similarly formed of two layers 21, 22. Poles P1, P2 define a transducing gap 23 therebetween. The layers 19, 21 that are formed adjacent to the gap 23 are referred to as inner layers, and the layers 18, 22 that are formed distally from the gap 23 are be referred to as outer layers.

Since the general concept of the invention applies similarly to both poles P1 and P2, the composition of only one pole, i.e., pole P1, will be described in greater detail. The materials of the layers 18 and 19 are not limited to conventional magnetic alloys such as nickel-iron (NiFe) or silicon-iron (SiFe), but may be selected from a wide variety of magnetic materials such as nickel alloys, amorphous cobalt alloys, iron alloys, cobalt iron alloys, or any magnetic material having high saturation magnetization ($4\pi M_s$), i.e., $4\pi M_s >> 10,000$ gauss. The layers 18, 19 have predetermined saturation magnetostrictions ($\lambda_s$) of approximately equal but opposite values, such that pole P1 exhibits a net magnetostriction of zero or close to zero. In one example, the preferred absolute value of the magnetostriction of layers 18, 19 does not exceed $\pm 20 \times 10^{-6}$.

With a proper arrangement of the layers 18, 19, 21, 22, it is possible to realize a high saturation magnetization ($4\pi M_s$), and thus a high write field gradient. To this end, the inner layers 19, 21 are formed of a material that has a high saturation magnetization, which results in a high $4\pi M_s$ for both inner layers 19, 21, while simultaneously maintaining the net magnetostriction of poles P1, P2 and the inductive head 10 close to zero. Consequently, the inductive head 10 offers improved performance at higher operating frequencies. Also, since the inner layers 19, 21 are optimized for high $4\pi M_s$, while the outer layers 18, 22 are independently selected to compensate for the magnetostriction of the inner layers 19, 21 such that the net magnetostriction of each pole P1, P2 is close to zero, it is now possible to use a wider variety of magnetic materials which would otherwise be unusable in inductive heads that interact with high coercivity media. In addition, such a configuration results in higher resolution and 2F amplitude.

The control of the magnetostrictions in the layers 18, 19, results in a balanced net magnetostriction in a prescribed range that is realized during the formation process of the poles. Pole P1 may be formed by plating; however, various other known techniques such as sputter deposition or evaporation may alternatively be used. When the plating of the outer layer 18 is completed, and a desired thickness with a targeted composition is attained, (for example one half of the overall thickness of pole P1), the plating variables, such as the wafer current ($I_w$) and the thief current ($I_{th}$) components of the plating current are adjusted to reverse the sign of the magnetostriction of the subsequent layer 19, in order to compensate for the magnetostriction of the outer layer 18 and thus to realize a net overall magnetostriction of pole P1 of approximately zero. A similar plating process is repeated for the layers 21, 22 of pole P2. While the foregoing example describes the net magnetostriction of the individual poles P1, P2 to be zero, it is also possible to bias the net magnetostrictions of poles P1, P2 within a controlled range, such that each pole exhibits a desired net magnetostriction value and polarity which may be useful.

In an embodiment of this invention, the layers 18, 19, 21, 22 are formed of a NiFe alloy. The composition of the NiFe alloy is in the range of 80–85% nickel and 15–20% iron by weight. This composition range provides the inner layers 19, 21 with a positive magnetostriction in the range of $+1 \times 10^{-6}$ to $+5 \times 10^{-6}$, and the outer layers 18, 22 with a negative magnetostriction of an approximately equal absolute value. As a result, the negative and positive magnetostrictions of the adjacent layers, i.e., 18, 19 and 21, 22, compensate each other such that the net magnetostrictions of poles P1, P2 are zero or essentially zero.

The following Table I and FIGS. 2 through 5 summarize various experimental results obtained using three inductive heads (Head 1, Head 2, Head 3) with different material compositions, in comparison to a control head using conventional technology. The empirical data clearly demonstrates that the inductive heads 10 according to the present invention provide a higher resolution, lower bit shift, higher 2F amplitude, and improved popcorn noise reduction.

TABLE I

PARAMETRIC DATA

| PARAMETER | CONTROL HEAD | HEAD 1 | HEAD 2 | HEAD 3 |
|---|---|---|---|---|
| Avg % Fe | 18 (uniform) | 20/18 | 18/16 | 20/16 |
| ETH | 6.16 ± .25 | 5.98 ± .25 | 6.04 ± .06 | 6.03 ± 0.21 |
| 2F Ampl. (uV) | 220.75 ± 9.9 | 260.4 ± 14.4 | 229.8 ± 7.01 | 221 ± 8.41 |
| Amp. COV | .0212 ± .0042 | .249 ± .009 | .0171 ± .0025 | .027 ± .004 |
| PW 50 | 62.99 ± 1.25 | 62.05 ± 1.23 | 65.6 ± .884 | 60.08 ± 1.3 |
| Resolution % | 82.38 ± 3.21 | 87.6 ± 2.93 | 81.55 ± 2.5 | 84.99 ± 2.9 |
| OW (dB) | 31.6 ± 1.26 | 31.5 ± 1.49 | 32.2 ± 1.12 | 30.57 ± 0.96 |
| Bitshift (ms) | 14.18 ± .29 | 13.28 ± .71 | 14.45 ± .062 | 13.77 ± 50 |
| Popcount 5ns delay Mean, sigma | 129 ± 128 | 70.9 ± 19.3 | 78 ± 9.4 | 83.2 ± 36 |
| Popcount sample size | 31 | 18 | 4 | 66 |

TABLE I-continued

PARAMETRIC DATA

| PARAMETER | CONTROL HEAD | HEAD 1 | HEAD 2 | HEAD 3 |
|---|---|---|---|---|
| Parametric sample size | 31 | 32 | 4 | 45 |

In the foregoing Table I, "Avg % Fe" refers to the average iron content; "ETH" represents that for equal values, the throat height of all magnetic heads is equal; "2F Ampl. (uV)" refers to 2F amplitude measured in microvolts; "Amp. COV" refers to amplitude covariance; "PW50" refers to the pulse width; "Resolution %" represents the resolution measured as a ratio of 2F amplitude over 1F amplitude; and "OW" represents overwrite measured in dB (decibels).

Figure 2:
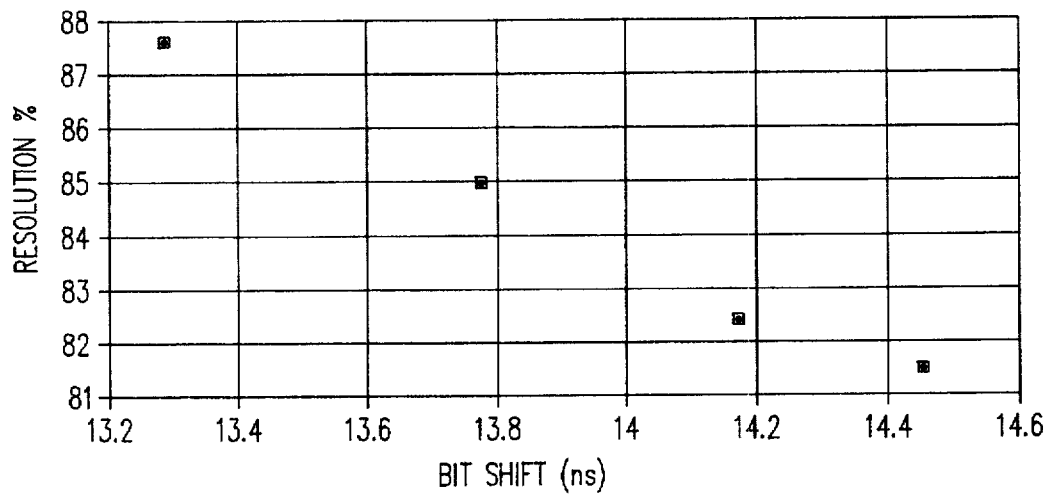
FIG. 2 is a graph plotting experimental values of the head resolution versus bit shift in nanoseconds.

FIG. 2 illustrates a linear relationship between the resolution and the bitshift, which relationship can be expressed by the following equation (1):

$$\text{Resolution} = 158.33 - 5.344 \text{ bitshift with a correlation coefficient of } 0.996. \quad (1)$$

Figure 3:
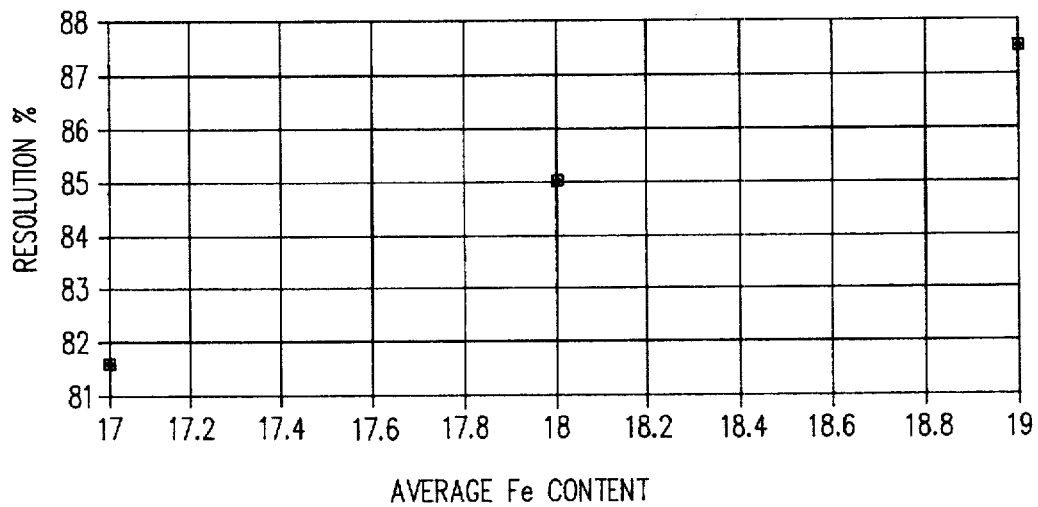
FIG. 3 is a graph plotting experimental values of the head resolution versus average iron content.
Figure 4:
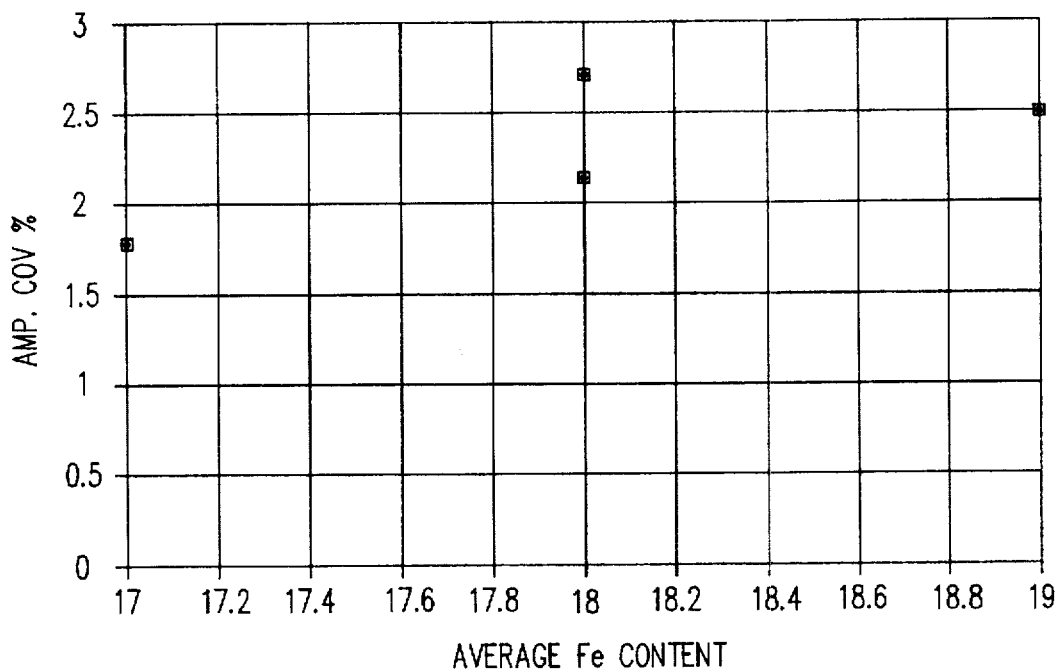
FIG. 4 is a graph plotting experimental values of the head amplitude covariance (COV) versus average iron content.
Figure 5:
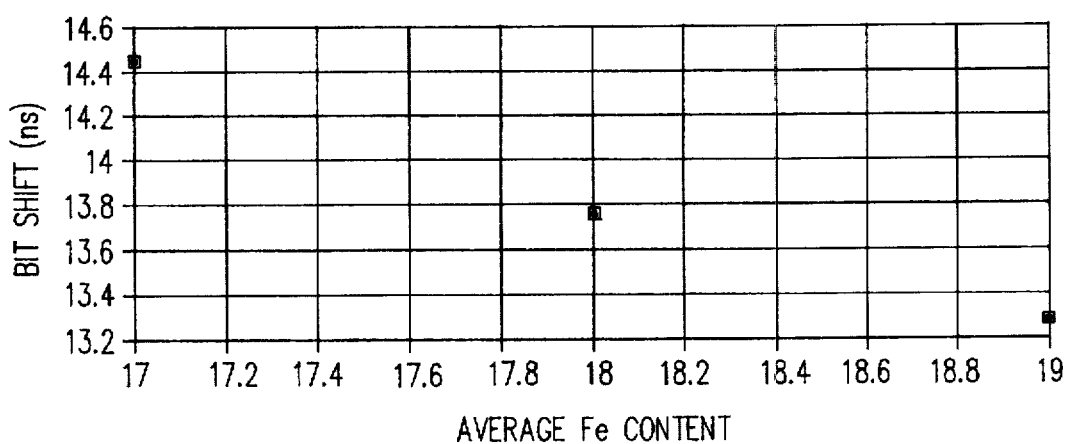
FIG. 5 is a graph plotting experimental values of the head bit shift versus average iron content.

FIGS. 3 and 5 illustrate that Head 1 and Head 3 with a higher average iron content than that of the control head (18%) result in a lower bitshift and a higher resolution than those of the control head. In addition, FIG. 4 shows that in spite of the higher iron content of Heads 1 and 3, these heads exhibit somewhat higher COV values than that of the control head, even though the soft error rates of Heads 1 and 3 would be expected to be smaller than the control head from the bitshift data alone. Thus, the expectation of higher resolution and smaller bitshift resulting from higher Bsat at the pole is realized.

The data in FIGS. 3 and 5 can be expressed by the following equations (2) and (3):

$$\text{Resolution} = 3.025 \text{ (Average iron content)} + 30.26. \quad (2)$$

$$\text{Bit shift (ns)} = 24.36 - 0.584 \text{ (Average iron content).} \quad (3)$$

It was also observed that the ratio of the resolution times 2F Amplitude divided by the bitshift (ns) is constant (i.e., 4.5%), as expressed by the following equation (4):

$$\text{Resolution/Bitshift (ns)/2F Amplitude} = 0.026 \pm 0.0012. \quad (4)$$

By combining equations (2) through (4), the 2F Amplitude can be estimated at various averages of iron content. Equation (5) provides an estimate of the saturation magnetization $(4\Pi M_s)$ of various NiFe alloys for Nickel content greater than or equal to 40%:

$$4\pi M_s = 4\pi [1500 - \{6.83 \text{ (\% Nickel content)} - 40\}]. \quad (5)$$

The following results are clearly evident from the experimental tests in Table I and FIGS. 2 through 5:

(1) The pop counts and their associated sigmas are lower for Heads 1, 2 and 3 relative to the control head.

(2) Even small back gap heads have both an average count and a lower sigma than the large back gap control.

(3) An analysis of variances for the popcorn data of Heads 1, 2 and 3 versus the control data shows that the variance of Heads 1, 2 and 3 are smaller than the variance of the control group, i.e., the narrower distribution in popcorn noise of Heads 1, 2 and 3 are verified.

Figure 6:
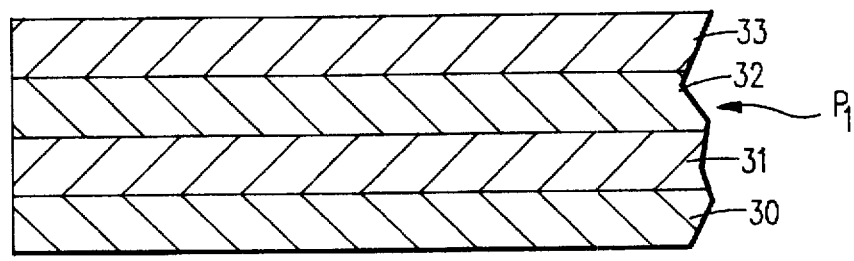
FIG. 6 is a partial enlarged cross-sectional view of a magnetic pole with exchange coupled multilayers for use in an inductive head according to the present invention.

FIG. 6 illustrates another magnetic pole, i.e., pole P1 with a plurality of exchange coupled layers 30, 31, 32, 33 for use in an inductive head. Pole P1 is made by alternately laminating a number of layers, i.e., 30, 32 that have positive magnetostriction, with an equal number of layers, i.e., 31, 33 that have negative magnetostriction, such that the net overall magnetostriction of pole P1 is close to zero, or in a biased form the net magnetostriction may be within a desired range. In this particular example the layers 32, 33 constitute the inner layers closer to the gap 23, and exhibit a higher average saturation magnetization $(4\pi M_s)$ and thus a high write field gradient. It should be understood that while only four layers 30–33 are shown in FIG. 6 for purpose of illustration, a different number of layers may alternatively be used. The manufacturing process of the magnetic layers 30–33 is similar to that of the magnetic layers 18, 19 of FIG. 1.

The following Table II summarizes the effect of the multilayered pole Pi on the overall change in the anisotropy field $\Delta H_k$, using four-inch square wafers and full film plating. Table II confirms that the multilayered pole configuration of FIG. 6 yields a $\Delta H_k$ that is essentially close to zero. $\Delta H_k$ is closely related to $\lambda_s$ in both sign and magnitude for the experimental conditions employed. Therefore, the balanced layers yield a $\lambda_s$ of approximately zero.

TABLE II

MULTI-LAYERED POLE

| No. of Layers | Wafer Current ($I_w$) | Thief Current ($I_{th}$) | Overall $\Delta H_k$ |
|---|---|---|---|
| 2 | 351 | 679 | −0.05 |
| 2 | 414 | 801 | −0.05 |
| 2 | 322 | 623 | 0.04 |
| 2 | 447 | 865 | 0.04 |
| 2 | 300 | 580 | 0.02 |
| 2 | 480 | 929 | 0.02 |
| 4 | 300 | 580 | 0.08 |
| 4 | 480 | 929 | 0.08 |
| 4 | 300 | 580 | 0.08 |
| 4 | 480 | 929 | 0.08 |

In yet another embodiment the plating wafer current ($I_w$) and thief current ($I_{th}$) are not uniformly maintained throughout the plating process, but are incrementally decreased. During production of thin film magnetic heads incorporating magnetic poles made of NiFe or Permalloy material, according to prior art processes, the thief current $I_{th}$ and the wafer current $I_w$ were decremented in steps of 10 milliamperes (ma) and 5 ma respectively. On average, a shift in composition of the pole material according to those currents occurred, resulting in a change of composition for about every 540 Angstroms of deposited material, thus approximating a quasi-continuous gradient in composition. The initial $I_{th}$ and $I_w$ at the start of plating were 930 ma and 480 ma respectively. After completion of 37 steps of depositing 540 Angstroms of magnetic material for each step, the final current values were $I_{th}=570$ ma and $I_w=300$ ma. The resultant thin magnetic film of about 2 microns in thickness showed a magnetostriction $(\Delta H_k)$ of approximately zero with an initial composition of about 21.2% weight of Fe in Ni and a final composition of about 18.3% weight of Fe in Ni. Thus the average composition was about 18.3% weight of Fe in Ni, which is very close to the zero magnetostriction composition of the NiFe binary system. The resultant $\Delta H_k$ of approximately zero of the 2 micron thick film indicated that the magnetostriction of this film was approximately zero.

Figure 7:
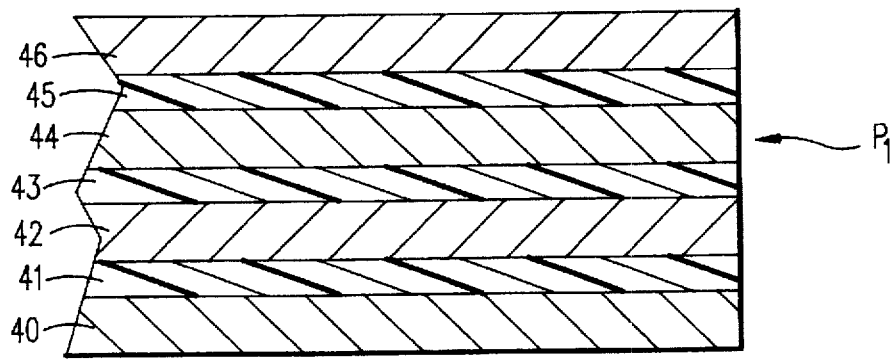
FIG. 7 is a partial enlarged cross-sectional view of an alternative magnetic pole with magnetostatically coupled multilayers for use in an inductive head according to the present invention.

FIG. 7 shows another alternative multilayered design for a pole, for use in an inductive head. Pole P1 is made by alternately laminating a number of magnetic layers, i.e., 40, 42, 44, 46 with nonmagnetic layers 41, 43, 45, for the magnetic layers 40, 42, 44, 46 to be magnetostatically coupled and not exchange coupled. The magnetic layers 40, 44 have a positive magnetostriction, and the layers 42, 46 have a negative magnetostriction, such that the net overall magnetostriction of pole P1 is close to zero, or is biased to slightly positive or negative values so that the net magnetostriction is within a desired range. The manufacturing process of the magnetic layers 40, 42, 44, 46 is similar to that of the magnetic layers 30–33 of FIG. 6, with the difference that the nonmagnetic layers 41, 43, 45 are interposed between the magnetic layers 40, 42, 44, 46. The magnetic layers 44, 46 constitute the inner layers closer to the gap 23, and exhibit a high saturation magnetization ($4\pi M_s$) and thus a high write field gradient closer to the gap 23. It should be understood that while only four magnetic layers 40, 42, 44, 46 are shown in FIG. 7, a different number of magnetic layers may alternatively be used.

It should be understood that the invention is not limited to the specific parameters, materials and embodiments described above. Various modifications and variations may be made within the scope of the present invention. For instance, the present invention may be embodied in yoke-type magnetoresistive (MR) and giant magnetoresistive (GMR) heads, shields for MR and GMR heads, transformers, and other thin film magnetic transducers.

What is claimed is:

1. An inductive magnetic head used for writing and reading magnetic signals onto and from a magnetic recording medium comprising:

a first magnetic pole P1 and a second pole P2 formed on a substrate and defining a gap therebetween;

said first magnetic pole P1 including an inner magnetic layer formed adjacent to said gap and an outer magnetic layer;

said second magnetic pole P2 including an inner magnetic layer formed adjacent to said gap and an outer magnetic layer;

said inner and outer magnetic layers of said first magnetic pole P1 having saturation magnetostrictions of approximately equal but opposite values, such that said first magnetic pole P1 exhibits a net magnetostriction of approximately zero or is biased within a predefined range;

said inner and outer magnetic layers of said second magnetic pole P2 having saturation magnetostrictions of approximately equal but opposite values, such that said second magnetic pole P2 exhibits a net magnetostriction of approximately zero or is biased within said predefined range;

wherein said inner magnetic layers of said first and second magnetic poles P1 and P2 are formed of a material that has a high saturation magnetization to realize a high write field gradient closer to said gap, and wherein said predefined range of the magnetostriction of said inner and outer layers of said first and second magnetic poles P1, P2 does not exceed approximately $\pm 20 \times 10^{-6}$.

2. The inductive magnetic head according to claim 1, wherein said predefined range of the magnetostriction of each of said inner and outer magnetic layers of said first and second magnetic poles P1, P2 is between approximately $\pm 0$ and approximately $\pm 5 \times 10^{-6}$.

3. The inductive magnetic head according to claim 1, wherein each of said first and second magnetic poles P1, P2 further includes a plurality of additional exchange coupled magnetic layers that are formed by alternately laminating a number of layers that have positive magnetostriction, with an equal number of layers that have negative magnetostriction, such that the net overall magnetostriction of each of said first and second magnetic poles P1, P2 is close to zero or is biased within said predefined range.

4. The inductive magnetic head according to claim 1, wherein each of said first and second magnetic poles P1, P2 includes a non-magnetic layer that is interposed between said inner and outer magnetic layers so that said inner and outer magnetic layers of each of said first and second magnetic poles P1, P2 are magnetostatically coupled.

5. The inductive magnetic head according to claim 1, wherein each of said first and second magnetic poles P1, P2 further includes a plurality of additional magnetostatically coupled magnetic layers that are formed by alternately laminating a plurality of magnetic layers with a plurality of non-magnetic layers; and wherein one half of said magnetic layers forming said first magnetic pole P1 has a positive magnetostriction, and the remaining half has a negative magnetostriction, such that the net overall magnetostriction of said first magnetic pole P1 is approximately zero or is biased within said predefined range.

6. The inductive magnetic head according to claim 5, wherein said second magnetic pole P2 further includes a plurality of additional magnetostatically coupled magnetic layers that are formed by alternately laminating a number of layers that have positive magnetostriction, with an equal number of layers that have negative magnetostriction, such that the net overall magnetostriction of said second magnetic pole P2 is close to zero or is biased within said predefined range.

7. The inductive magnetic head according to claim 1, wherein any one or more of said first or second magnetic poles P1, P2 includes a nonmagnetic layer that is interposed between said inner and outer magnetic layers of said first or second magnetic poles P1, P2, so that said inner and outer magnetic layers are magnetostatically coupled.

8. The inductive magnetic head according to claim 7, wherein any one or more of said first or second magnetic poles P1, P2 further includes a plurality of additional magnetostatically coupled layers that are formed by alternately laminating a plurality of magnetic layers with a plurality of non-magnetic layers; and wherein one half of said magnetic layers has a positive magnetostriction, and the remaining half of said magnetic layers has a negative magnetostriction, such that the net overall magnetostriction of any of said first or second magnetic poles P1, P2 is approximately zero or is biased within said predefined range.

* * * * *